(12) United States Patent
Lai

(10) Patent No.: US 8,250,224 B2
(45) Date of Patent: *Aug. 21, 2012

(54) METHOD, SYSTEM, DEVICE, COMPUTER-READABLE MEDIUM, AND NETWORK FOR CARRYING COMMUNICATIONS

(75) Inventor: Frederick Chee-Kiong Lai, Bedford (CA)

(73) Assignee: Research In Motion Limited, Waterloo, Ontario (CA)

( * ) Notice: Subject to any disclaimer, the term of this patent is extended or adjusted under 35 U.S.C. 154(b) by 7 days.

This patent is subject to a terminal disclaimer.

(21) Appl. No.: 12/907,419

(22) Filed: Oct. 19, 2010

(65) Prior Publication Data

US 2011/0035504 A1 Feb. 10, 2011

Related U.S. Application Data

(63) Continuation of application No. 11/552,539, filed on Oct. 25, 2006, now Pat. No. 7,840,686.

(51) Int. Cl.
*G06F 15/16* (2006.01)
(52) U.S. Cl. ......... 709/228; 709/227; 709/229; 709/230
(58) Field of Classification Search .................. 709/227, 709/228, 229, 230
See application file for complete search history.

(56) References Cited

U.S. PATENT DOCUMENTS

| 6,587,680 | B1 * | 7/2003 | Ala-Laurila et al. | 455/411 |
|---|---|---|---|---|
| 6,636,898 | B1 * | 10/2003 | Ludovici et al. | 709/250 |
| 7,072,657 | B2 * | 7/2006 | Watanabe et al. | 455/439 |
| 7,266,715 | B1 * | 9/2007 | Bazzinotti et al. | 714/4.4 |
| 7,350,233 | B1 * | 3/2008 | Lee et al. | 726/15 |
| 7,689,722 | B1 * | 3/2010 | Timms et al. | 709/249 |
| 2003/0140131 | A1 * | 7/2003 | Chandrashekhar et al. | 709/223 |
| 2005/0088977 | A1 * | 4/2005 | Roch et al. | 370/254 |
| 2006/0020787 | A1 * | 1/2006 | Choyi et al. | 713/165 |
| 2007/0046436 | A1 * | 3/2007 | Tanaka | 340/10.2 |
| 2007/0078819 | A1 * | 4/2007 | Zayas et al. | 707/2 |
| 2007/0205868 | A1 * | 9/2007 | Tanaka | 340/10.2 |
| 2007/0205869 | A1 * | 9/2007 | Tanaka | 340/10.2 |

OTHER PUBLICATIONS

Lai, Chee-Kong (Frederick), "Method and System for Conducting Communications Over a Network", U.S. Appl. No. 11/552,539, filed Oct. 25, 2006, Now U.S. Patent No. 7840686, Issued Nov. 23, 2010.

* cited by examiner

*Primary Examiner* — Hieu Hoang
(74) *Attorney, Agent, or Firm* — Perry+Currier Inc.; Stephen J. Perry

(57) ABSTRACT

A method and system for conducting communications over a network is provided. An embodiment includes a server that is connectable to a client machine via a virtual private network that includes a VPN concentrator. The client machine and the VPN concentrator are configured to delay renegotiation of the VPN link in the event that an important stream is being carried over the VPN link.

21 Claims, 9 Drawing Sheets

METHOD, SYSTEM, DEVICE, COMPUTER-READABLE MEDIUM, AND NETWORK FOR CARRYING COMMUNICATIONS

CROSS-REFERENCE TO RELATED APPLICATION

This application is a continuation application of U.S. patent application Ser. No. 11/552,539 filed Oct. 25, 2006, the contents of which is incorporated by reference.

FIELD OF THE INVENTION

The present specification relates generally to network architectures and more particularly relates to method and system for conducting communications over a network.

BACKGROUND OF THE INVENTION

Convergence of voice and data networks is predicted to lead to the eventual disappearance of the traditional public switched telephone network ("PSTN"). Eventually, virtually all applications, be they voice or of another nature, will all be carried over the data networks like the Internet. Voice is simply becoming another data application.

However, the process of convergence is forcing the underlying quality of service paradigms of data networks to be reconsidered. Data applications carried over data networks have traditionally been non-tolerant of errors, but tolerant of delay. Voice, however, has precisely the opposite characteristics, in that it is tolerant of error, but non-tolerant of delay.

Data security is also a highly significant concern and leading to rapid developments to ensure that data can be transmitted over networks without a material risk of eavesdropping. Such security is also becoming highly desirable in voice communications.

Wireless access is also a highly desirable feature of data networks. However, wireless access also presents its own challenges when addressing data security concerns and quality of service concerns.

It is becoming increasingly desirable to offer certain non-delay tolerant streams, such as Voice over Internet Protocol ("VOIP") telephone calls through virtual private networks ("VPN"), which may or may not have wireless segments that implement those networks. VOIP calls, when properly effected, can be secure, convenient and relatively inexpensive. However, existing architectures can lead to dropped calls and other problems. Improvements are needed.

DETAILED DESCRIPTION OF THE EMBODIMENTS

Figure 1:
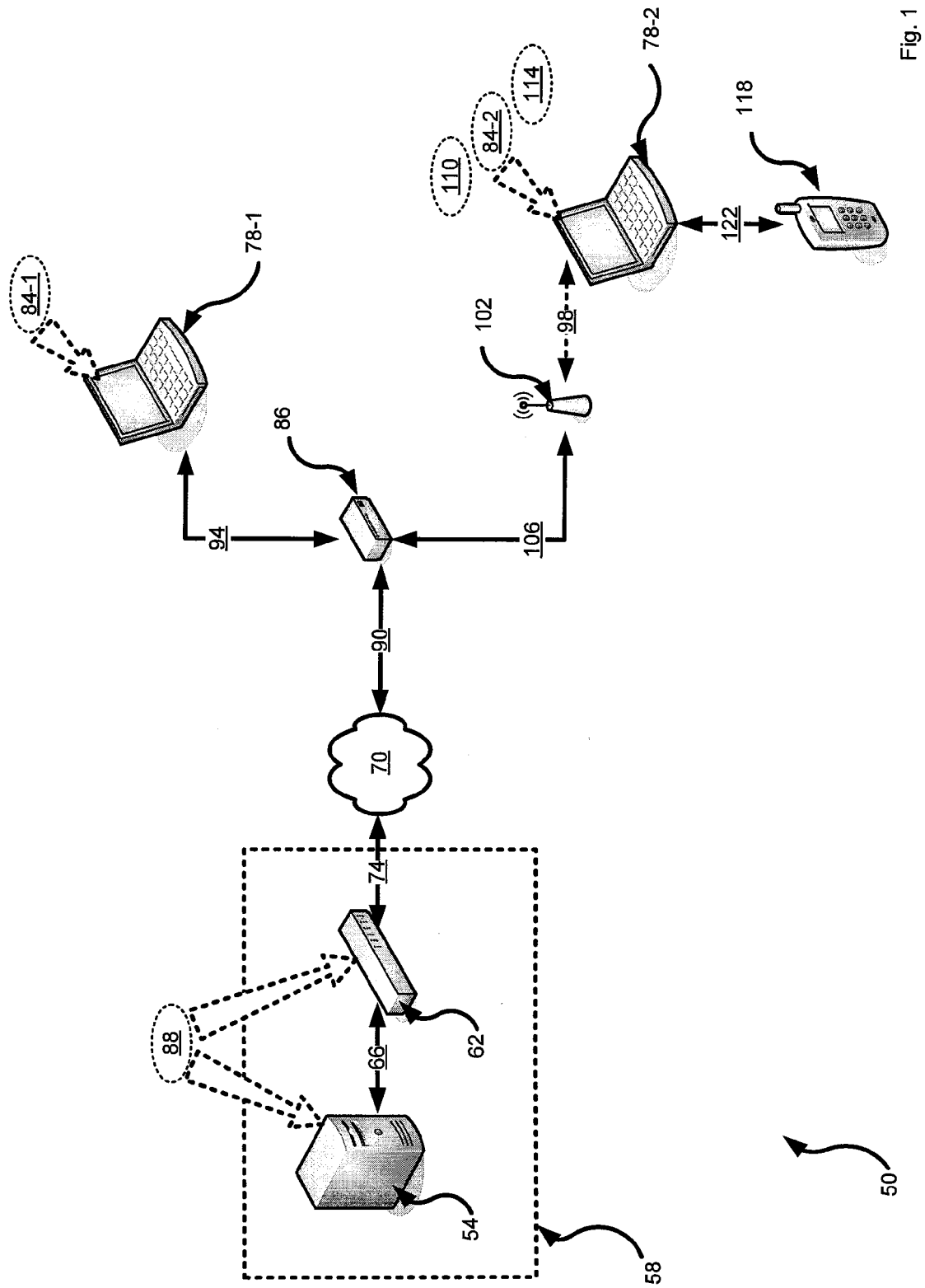
FIG. 1 shows a schematic representation of a system for conducting communications over a network in accordance with an embodiment.

An aspect of the present disclosure provides a method for carrying communications comprising:
  establishing a virtual private network (VPN) connection between a client machine and a server via a VPN concentrator;
  periodically determining whether a stream of data being carried over the VPN connection is important;
  instructing the VPN concentrator to cease periodic requesting of renegotiation of the VPN connection when it is determined that the stream of data is important; and,
  instructing the VPN concentrator to resume periodic requesting of renegotiation of the VPN connection when it is determined that the stream of data is not important.

The stream of data can be a voice telephone call in which case the stream is determined to be important. The stream of data can be carried via the Transport Control Protocol ("TCP") in which case the stream is also determined to be important.

The periodically determining step can be performed by the client machine, or another component in the network such as the VPN concentrator.

The VPN connection can have a priority indicator associated therewith. The priority indicator is for indicating whether the stream of data is important.

The client machine can be a WIFI-enabled portable handset configured to establish voice over Internet protocol telephone calls via WIFI hotspots.

The method can further comprise:
  after instructing the VPN concentrator to cease periodic requesting of renegotiation of the VPN connection, and after an elapsed time of a predefined time period:
    automatically instructing the VPN concentrator to resume periodic requesting of renegotiation of the VPN connection.

In addition to the above, the method of can also comprise:
  prior to automatically instructing the VPN concentrator to resume periodic requesting of renegotiation of the VPN connection, determining if the stream of data remains important and,
    if the data stream remains important:
      reinstructing the VPN concentrator to cease periodic requesting of renegotiation of the VPN connection; and,
      resetting the elapsed time to zero.

Another aspect of this disclosure provides a system for carrying communications comprising:
  a network;
  a client machine connected to the network;
  a virtual private network (VPN) component;
  a server associated with the VPN component and connected to the client machine via the network through the VPN component;
  the server and the client machine collectively configured to establish a VPN connection therebetween;
  the client machine configured to periodically determine whether a stream of data being carried over the VPN connection is important;

the client machine configured to instruct the VPN component to cease periodic requesting of renegotiation of the VPN connection when it is determined that the stream of data is important; and, the client machine configured to instruct the VPN component to resume periodic requesting of renegotiation of the VPN connection when it is determined that the stream of data is not important.

The VPN component can be a VPN concentrator. However, the VPN component can also be incorporated into the server.

The stream of data can be a voice telephone call in which case the stream is determined to be important. The stream of data can be carried via the Transport Control Protocol ("TCP") in which case the stream is also determined to be important.

The VPN connection can have a priority indicator associated therewith. The priority indicator is for indicating whether the stream of data is important.

The client machine can be a WIFI-enabled portable handset configured to establish voice over Internet protocol telephone calls via WIFI hotspots.

Another aspect of this disclosure provides a client machine for conducting communications with a server over a network. The network includes a virtual private network (VPN) component associated with the server. The server and the client machine are collectively configured to establish a VPN connection therebetween. The client machine comprises an application that is configured to:

periodically determine whether a stream of data being carried the VPN connection is important;

instruct the VPN component to cease periodic requesting of renegotiation of the VPN connection when it is determined that the stream of data is important; and, instruct the VPN component to resume periodic requesting of renegotiation of the VPN connection when it is determined that the stream of data is not important.

Another aspect of this disclosure provides a computer-readable medium for storing a plurality of programming instructions. The programming instructions can implement the functionality of any of the teachings herein.

Referring now to FIG. 1, a system for conducting communications over a network is indicated generally at 50. As will be discussed below, system 50 will be discussed in relation to certain items of hardware and various types of soft and hard connections therebetween. Certain examples of implementations will be discussed, but it should be understood that such implementations are exemplary for the purposes of explanation, and are not intended to be limiting. Persons skilled in the art will appreciate variations, combinations, subsets and substitutions for those implementations and for system 50 in general.

System 50 includes a server 54 which in a present embodiment is operated by an enterprise 58. Server 54 hosts a virtual private network ("VPN") for users that are authorized to access server 54. Server 54 is connected to a VPN concentrator 62 via a link 66 which is also operated by enterprise 58.

Server 54 can be based on any desired computing platform such as the Sun Fire X4100 from Sun Microsystems, Inc. 4150 Network Circle Santa Clara, Calif. 95054 or the HP Integrity rx3600 Server from Hewlett Packard Hewlett-Packard Company, 3000 Hanover Street. Palo Alto, Calif. 94304-1185 USA. These are but two examples of implementations for server 54 and they are non-limiting examples. Likewise VPN concentrator 62 can be based on any desired VPN concentrator platforms such as the Cisco VPN Concentrator 3000 from Cisco Systems, Inc. 170 West Tasman Dr. San Jose, Calif. 95134 USA. This is but one example of an implementation for VPN concentrator 62 and it is a non-limiting example. Link 66 can be based on any type of networking connection, and in a present embodiment is a physical Ethernet connection. Again, however, this is a non-limiting example. Those skilled in the art should now appreciate that, in other embodiments, the functionality of concentrator 62 can be incorporated directly into server 54.

VPN concentrator 62, in turn, is connected to the Internet 70 via a backhaul 74. Backhaul 74 can be based on physical links such as T1, T3, or OC3, or can be based on digital subscriber line ("DSL") or Community Access Television ("CATV") cable Internet links. Again, these are non-limiting examples.

The connection of server 54 to Internet 70 provides any client machines that are connected to Internet 70 with access to server 54 provided those client machines are permitted to access the VPN administrated by VPN concentrator 62. In a present embodiment, two client machines are shown, in the form of a first laptop 78-1 and a second laptop 78-2. (Generically referred to herein as laptop 78, and collectively referred to herein as laptops 78. This nomenclature is used for other components discussed herein.) Laptop 78-1 executes a VPN client application 84-1 which cooperates with VPN host application(s) 88 that execute on server 54 and/or concentrator 62 in order to provide VPN connectivity between client 78-1 and server 54. Likewise, laptop 78-2 executes a VPN client application 84-2 (substantially the same as VPN client application 84-1) which cooperates with VPN host application(s) 88 that execute on server 54 and/or concentrator 62 in order to provide VPN connectivity between laptop 78-2 and server 54.

Those of skill in the art will appreciate that where laptop 78 uses the Windows™ XP operating system (available from Microsoft Canada Co. 1950 Meadowvale Blvd, Mississauga, Ontario L5N 8L9 and its affiliated entities) then the underlying functionality of VPN client application 84-2 can be incorporated into the functionality of that operating system and is accessible to the user under the "Network Connections" application found under the "Control Panel" of Windows™ XP. By the same token, where VPN concentrator 62 is based on the Cisco VPN Concentrator 3000 from Cisco Systems, Inc. 170 West Tasman Dr. San Jose, Calif. 95134 USA then VPN host application 88 can be based on the VPN host software provided with the VPN Concentrator 3000.

Laptop 78-1 connects to Internet 70 via a router 86. Router 86 can be implemented in any manner. As one non-limiting example, router 86 can be a combined DSL modem-router, and thus link 90 between router 86 and Internet 70 can be based on a DSL architecture. According to this example, link 94 between router 86 and laptop 78-1 can be based on Ethernet.

Laptop 78-2 connects to Internet 70 also via router 86, however, a WIFI link 98 between router 86 and laptop 78-2 also forms part of the overall connection between laptop 78-2 and Internet 70. That overall connection thus also includes a WIFI access point 102 and an Ethernet link 106 between WIFI access point 102 and router 86. Thus, laptop 78-2 also includes a built-in WIFI transceiver (not shown).

WIFI link 98 can be based on, for example, 802.11g or any of its variants or Bluetooth. Laptop 78-2 also executes a WIFI client application 110 in order to carry traffic over link 98 using its built-in WIFI transceiver. Those of skill in the art will appreciate that where WIFI link 98 is based on 802.11g, and laptop 78-2 uses the Windows™ XP operating system (available from Microsoft Canada Co. 1950 Meadowvale Blvd, Mississauga, Ontario L5N 8L9 and its affiliated entities) then WIFI client application 110 can be incorporated into the functionality of that operating system and is accessible to the user under the "Network Connections" application found under the "Control Panel" of Windows™ XP.

Laptop 78-2 also hosts a VOIP application 114. Well-known commercial VOIP applications include Skype (www.skype.com), or the "softphone" client from Vonage (www.vonage.com). These two examples are representative of the functionality offered by VOIP application 114. It should be understood VOIP application 114 can be any VOIP application that is commercial or proprietary, which allows VOIP telephone calls to be conducted via laptop 78-2 in accordance with the teachings herein. Thus laptop 78-2 also connects to a telephony handset 118 via a local link 122. Local link 122 can be wired and based on Universal Serial Bus ("USB") or wireless and based on Bluetooth or the like. Telephony handset 118 thus permits a user of handset 118 to conduct voice telephone calls via the VOIP application executing on laptop 78-2.

In a present embodiment, VPN client applications 84 and VPN host applications 88 include extended functionality for exchanging a set of renegotiation control messages associated with a VPN protocol used to facilitate communications therebetween. The VPN protocol also includes a priority indicator for indicating the importance of a particular application being carried by the VPN connection between the VPN client application 84 and the VPN host application.

The renegotiation control messages in the VPN protocol are used in association with the priority indicator. The renegotiation control messages can be implemented as a delay-renegotiation message and a resume-renegotiation message. When the priority indicator indicates that the particular application being carried over the VPN connection should not be interrupted, the delay-renegotiation message can be used to completely delay the time period after which the VPN concentrator 62 will automatically demand that laptop 78 drop and renegotiate the VPN connection. (Alternatively, though presently less preferred for security reasons, the delay-renegotiation message can be substituted for a stop-renegotiation message, to instruct VPN concentrator 62 to stop automatically demanding that laptop 78 drop and renegotiate the VPN connection.) The resume-renegotiation message can be used at any time by laptop 78, to indicate that VPN concentrator 62 can resume demanding that the laptop 78 drop and renegotiate the VPN connection.

Below non-limiting and exemplary pseudocode formats and structures are provided for the control of the VPN:

---

Priority Indicator
IMPORTANT_STREAM: This priority indicator would be included in the VPN traffic
to indicate that the particular application carried via the VPN is important and
should not be interrupted.
Renegotiation Control Messages
OpCode (unsigned int), Parameter (unsigned int)
Delay Renegotiation Message Format
DELAY_RENEGO message
OpCode: 0x00000001 unsigned int (32 bits) temporarily delay VPN renegotiation
    Parameter: Estimated maxiumum renegotiation delay time required, in
    milliseconds. If this timeout is reached by the VPN concentrator without
    receiving a RESUME_RENEGO message, then the VPN concentrator
    would be able to renegotiate the VPN at any time according to its protocol.
Resume Renegotiation Message Format
RESUME_RENEGO message
OpCode: 0x00000002 (32 bits) resume VPN renegotiation
    The protocol stack implementing the IMPORTANT_STREAM interested in
    suspending VPN negotiation would send a DELAY_RENEGO message
    when the stack is about to start an instance an IMPORTANT STREAM. A
    timer would be set internally that would substantially coincide with the expiry
    of the DELAY_RENEGO message, but would allow time to resend a new
    DELAY_RENEGO message, if the message were required. A typical value
    for a VOIP call would be about 30 minutes, with the internal timeout being
    set to 29 minutes or so.
    If the internal timer expires, if the IMPORTANT_STREAM is still in use, then
    a new DELAY_RENEGO message would be sent to the concentrator so that
    the VPN lease renegotiation could be further delayed.
    If the IMPORTANT_STREAM shuts down before the internal timer expires,
    the stack would send a RESUME_RENEGO message to the concentrator to
    allow it to resume any scheduled VPN renegotiations.

---

Figure 2:
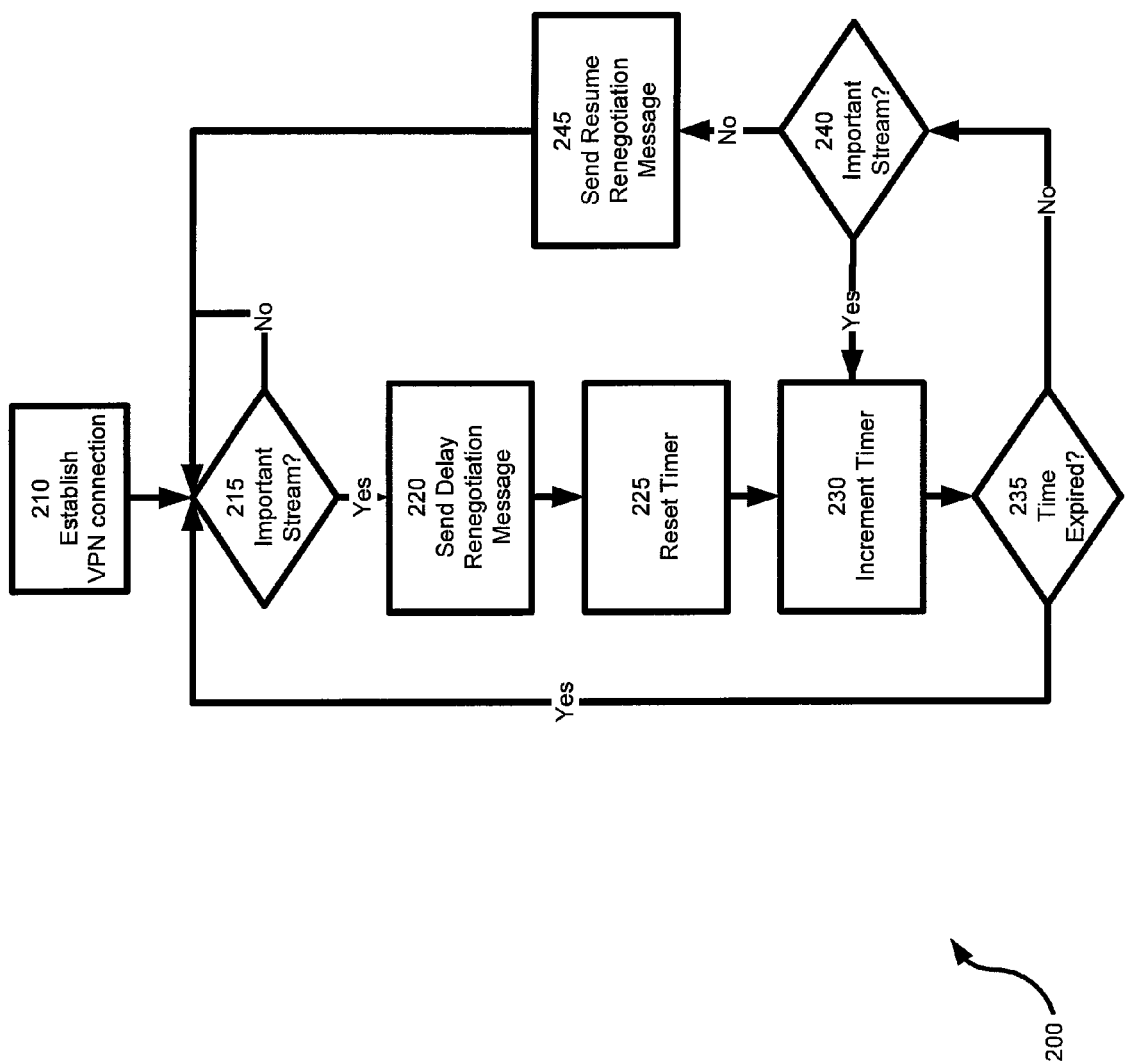
FIG. 2 shows a flow-chart depicting a method for conducting communications over a network in accordance with another embodiment.

Referring now to FIG. 2, a flow-chart depicting a method for conducting communications over a network is indicated generally at 200. For the purpose of explaining method 200, it will be assumed that method 200 is performed using system 50. However, it should be understood that method 200 can be performed on other configurations of systems, other than system 50. Likewise, it should also be understood that method 200 can be varied and need not be performed exactly as shown.

Figure 3:
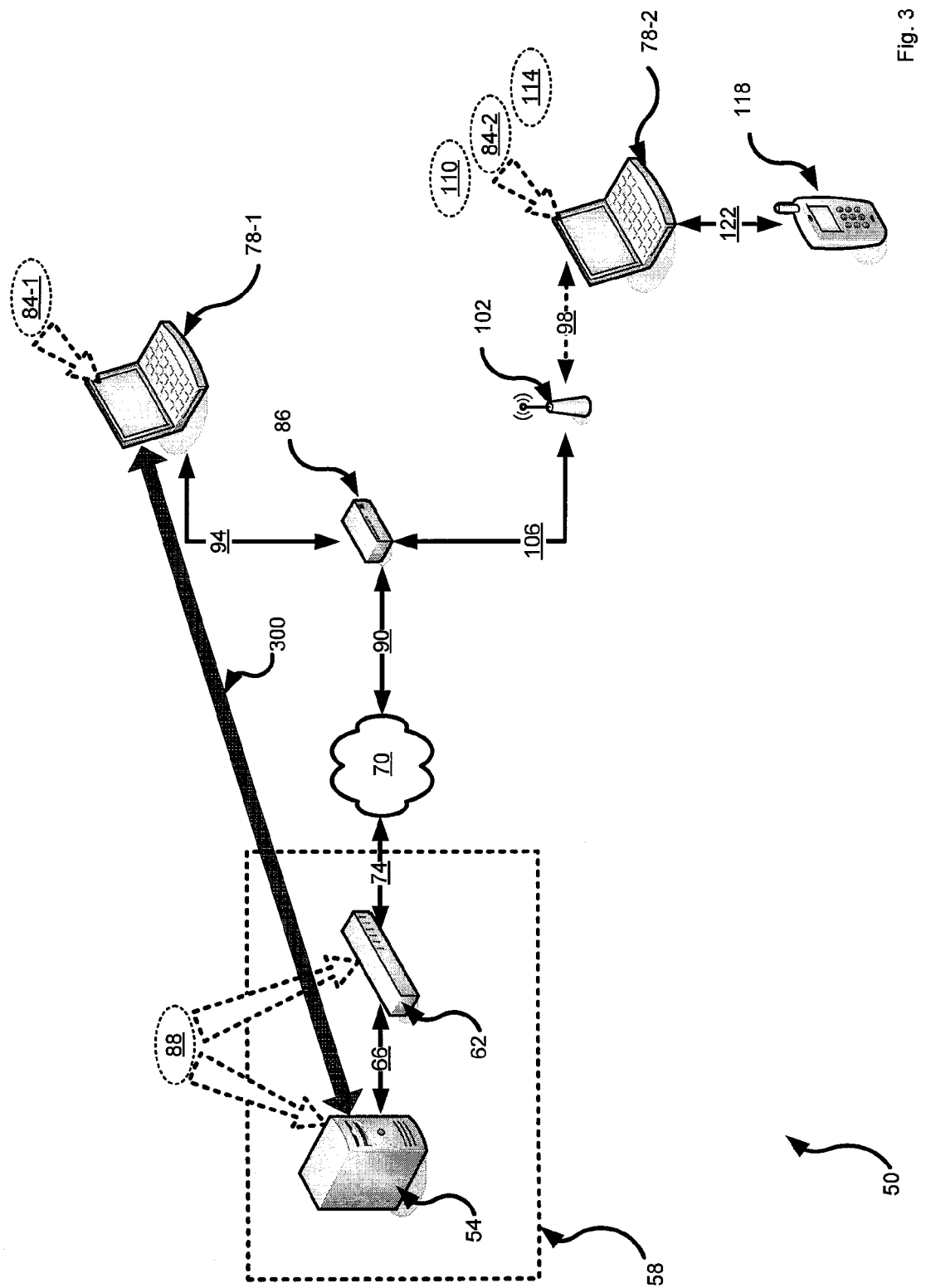
FIG. 3 shows the system of FIG. 1 during the performance of certain steps of the method of FIG. 2.

Beginning at step 210, a VPN connection is established. During this discussion of the performance of method 200, it will be assumed that a VPN connection 300 is established between laptop 78-1 and server 54 via VPN concentrator 62 using the previously described architecture of system 50. VPN connection 300 is represented in FIG. 3. Step 210 can be performed by VPN client application 84-1 communicating with VPN host application 84-2 to establish VPN connection 300.

Figure 4:
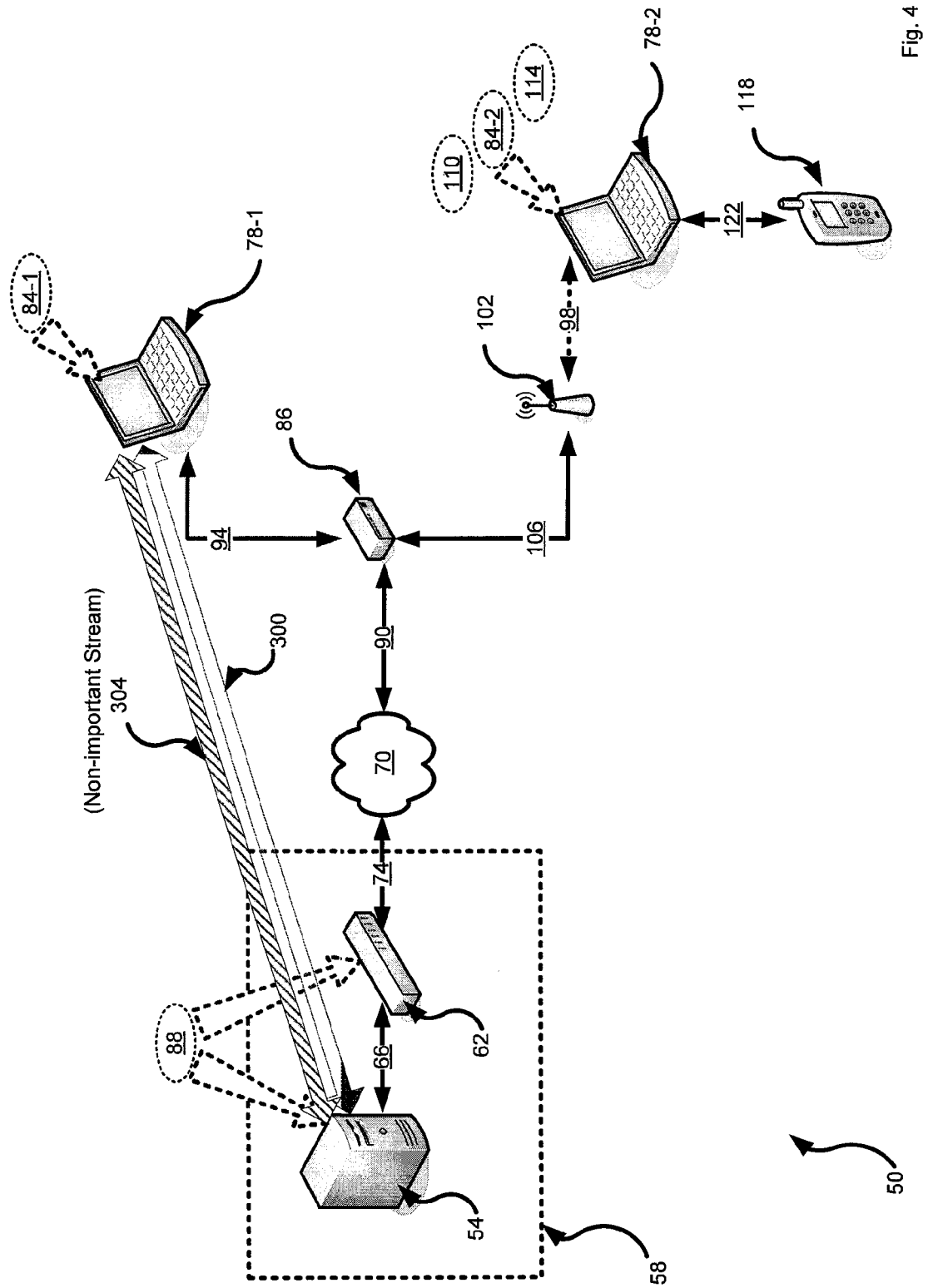
FIG. 4 shows the system of FIG. 1 during the performance of certain steps of the method of FIG. 2.

Having established VPN connection 300, laptop 78-1 can then be invoked to execute any desired user-application that makes use of VPN connection 300. Whichever user-application is invoked, the user-application will have a priority indicator associated therewith. In a present embodiment, the priority indicator will indicate whether or not the user-application constitutes an important stream over VPN connection 300. For example, where the user-application is web browsing or email, then typically the priority indicator associated with traffic carried over VPN connection 300 relative to that user-application would not indicate that the user-application is an important stream. In FIG. 4, a user-application that is not an important stream is indicated at 304. User-application 304 is carried over VPN connection 300, and the priority indicator which is part of the protocol that constitutes VPN connection 300 will indicate that user-application 304 is not an important stream. Thus, when method 200 advances to step 215, a determination will be made that "no" there is no important stream being carried over VPN connection 300 and thus method 200 will continually cycle at step 215, essentially "waiting" until an important stream is detected. Thus, user-application 304 will be subject to all of the known restrictions of VPN connections, and will thus be subject to automatic periodic renegotiation according to the configuration of VPN concentrator 62.

Figure 5:
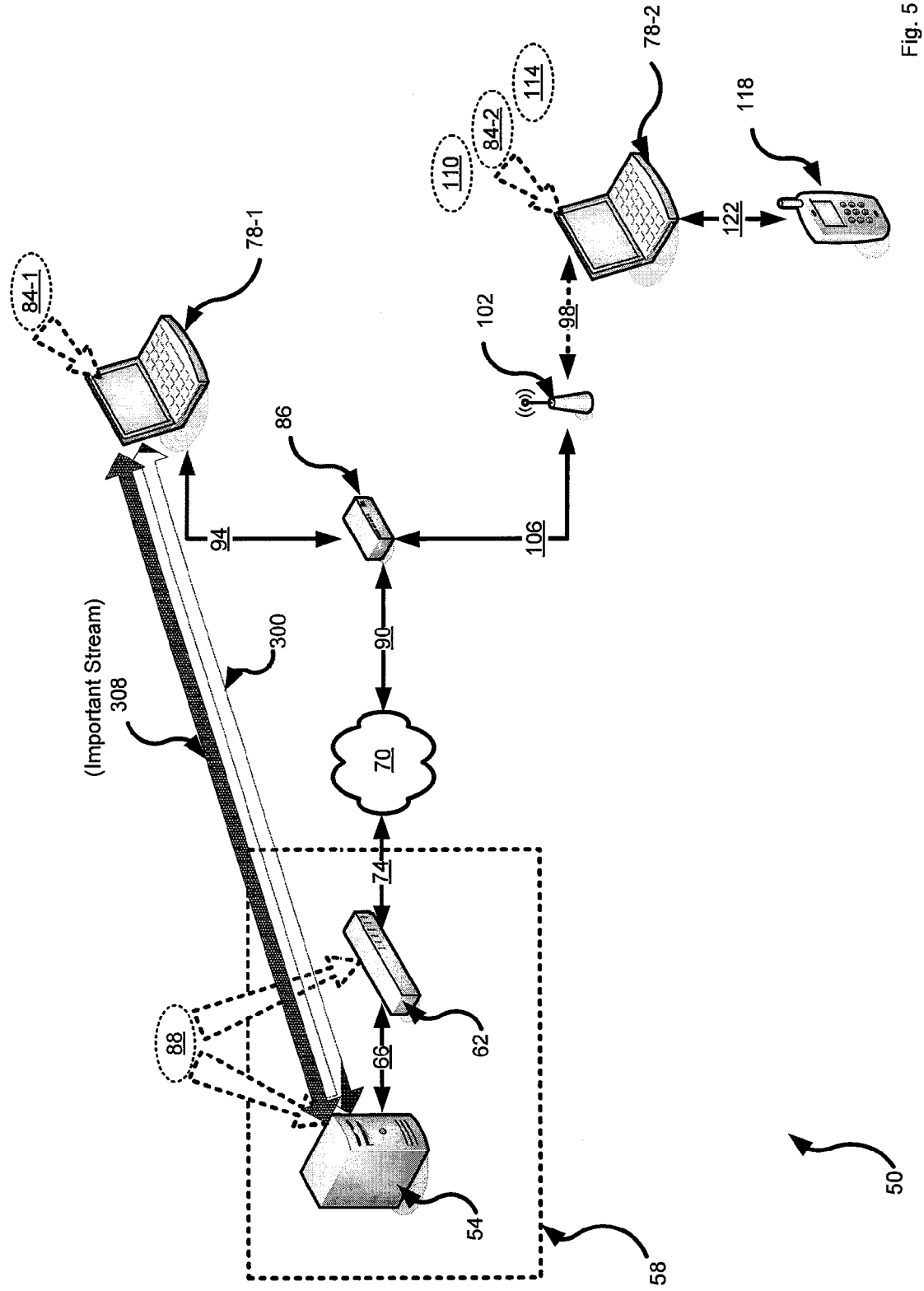
FIG. 5 shows the system of FIG. 1 during the performance of certain steps of the method of FIG. 2.

However, assume that laptop 78-1 begins executing a user-application 308 that is deemed to be an important stream, as represented in FIG. 5. Assume, for example, that user application 308 is carried via a Transmission Control Protocol ("TCP") session, in which case without the teachings of the present embodiment, a regular renegotiation of the VPN connection 300 would occur according to the regular performance of VPN concentrator 62, which would cause the visible Internet Protocol ("IP") address of VPN concentrator 62 to change, which would kill the user-application 308. However, in accordance with the teachings of the present embodiment, user-application 308 is carried over VPN connection 300, and the priority indicator which is part of the protocol that constitutes VPN connection 300 will indicate that user-application 308 is an important stream. Thus, when method 200 advances to step 215, a determination will be made that "yes" there is an important stream being carried over VPN connection 300 and thus method 200 will advance from step 215 to step 220.

Figure 6:
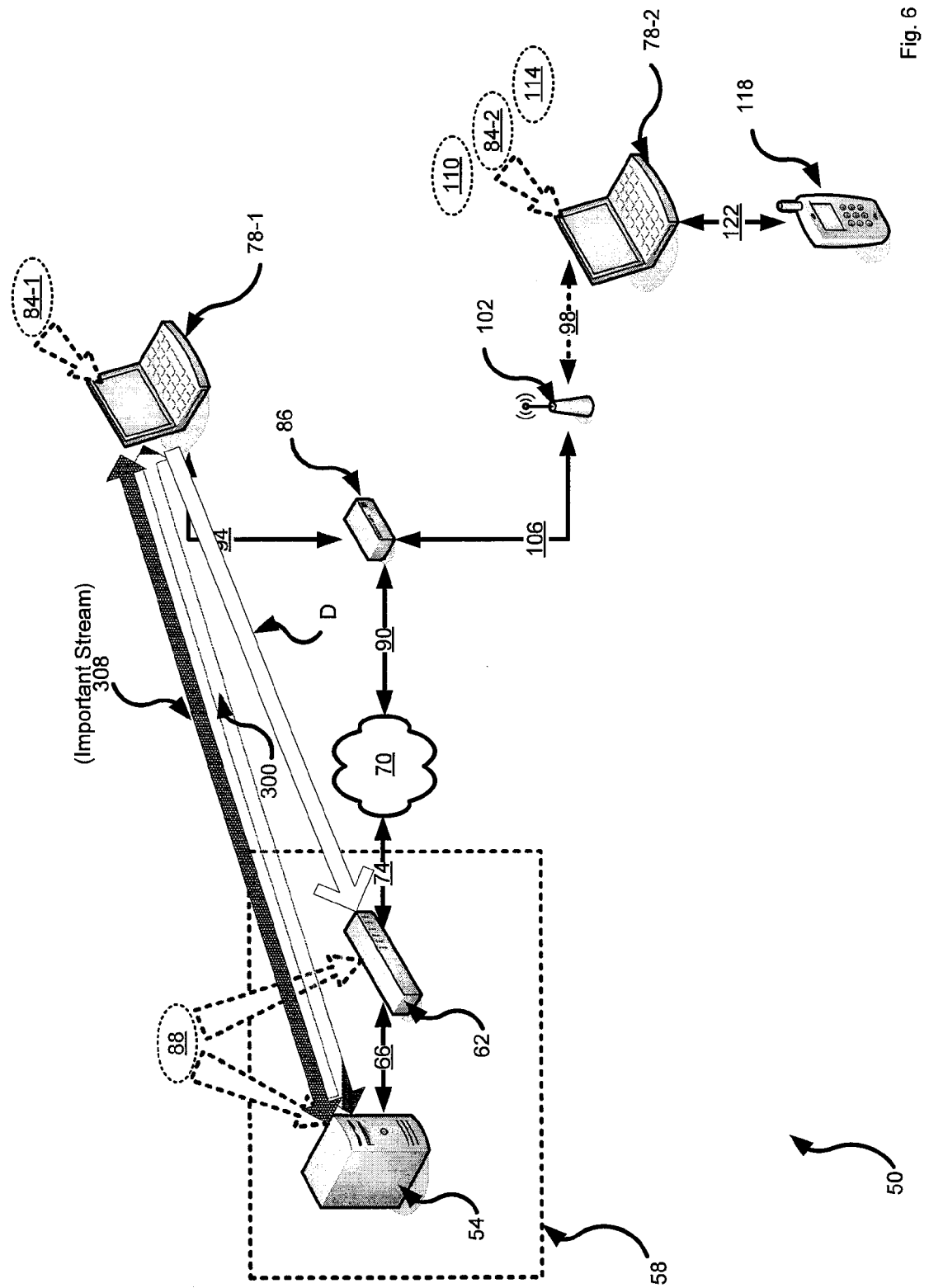
FIG. 6 shows the system of FIG. 1 during the performance of certain steps of the method of FIG. 2.
Figure 7:
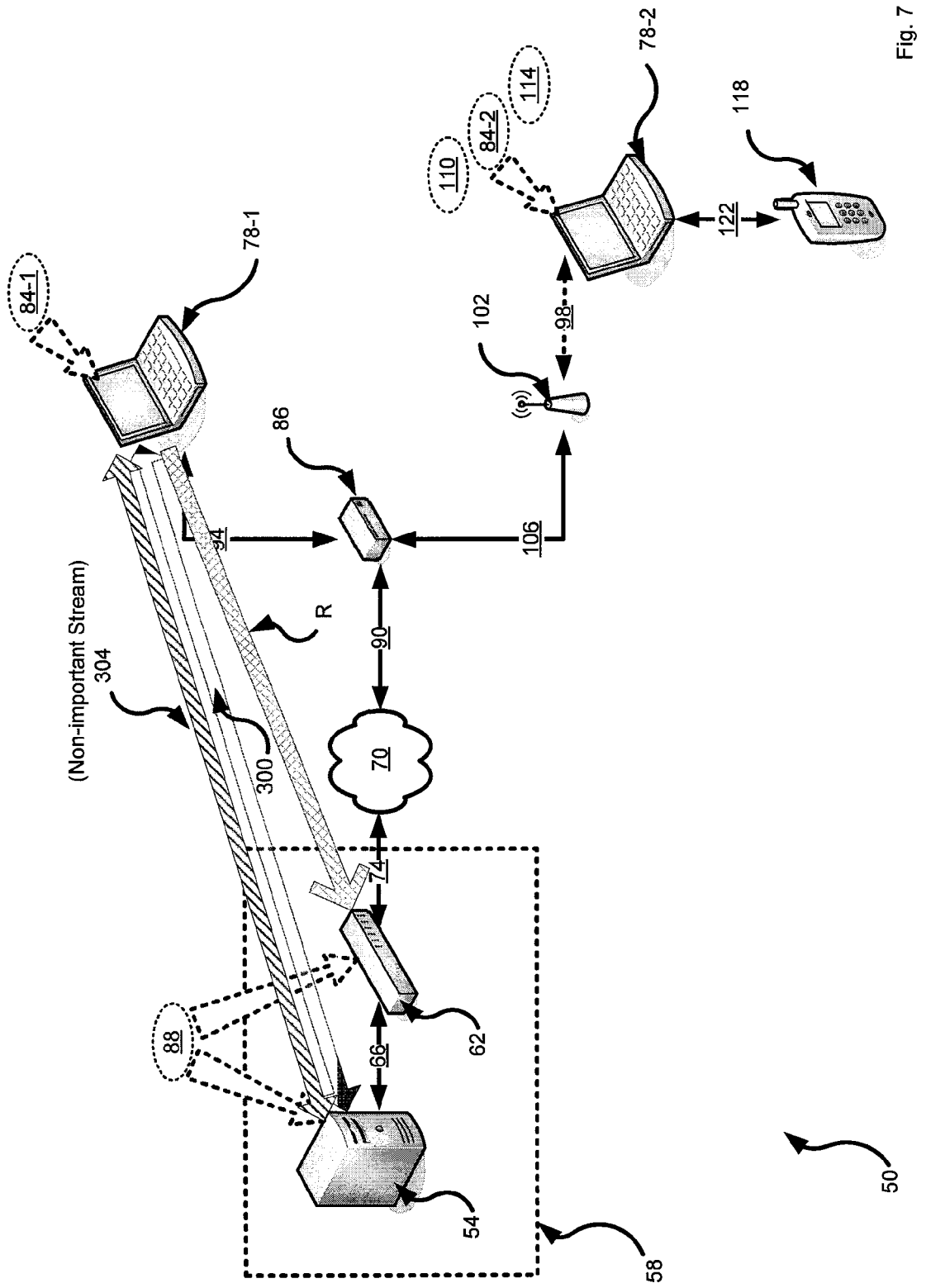
FIG. 7 shows the system of FIG. 1 during the performance of certain steps of the method of FIG. 2.

Next, at step 220, a delay renegotiation message is sent. Step 220 is represented in FIG. 6, where laptop 78-1 is shown sending a delay renegotiation message D to VPN concentrator 62. Message D is a single message, and thereafter communications between laptop 78-1 and server 54 will resume to the format represented in FIG. 5.

Next, at step 225, a timer is reset. In a present embodiment, the timer is maintained within laptop 78-1. The timer is initially set to zero, and set to expire at a time just before VPN concentrator 62 is configured to force the renegotiation of VPN connection 300. For example, if VPN concentrator 300 is normally configured to force a renegotiation after about thirty minutes, then the timer can be configured to expire after about twenty-nine minutes. In an embodiment, the timer can be configured to expire within one minute before the VPN is normally configured to force a renegotiation. In another embodiment, the timer can be configured to expire within thirty seconds before the VPN is normally configured to force a renegotiation. In another embodiment, the timer can be configured to expire within ninety seconds before the VPN is normally configured to force a renegotiation. In another embodiment, the timer can be configured to expire within two minutes before the VPN is normally configured to force a renegotiation. The time of expiration can be chosen to accommodate latency between laptop 78-1 and VPN concentrator 62, so that VPN concentrator 62 receives the delay renegotiation message from step 220 just prior to the VPN concentrator 62 actually forcing the renegotiation. The time of expiration can be dynamically adjusted according to the determined latency between laptop 78-1 and VPN concentrator 62. In another embodiment, as an additional security measure, laptop 78-2 can negotiate the predefined expiry time period with VPN concentrator 62.

Next, at step 230, the timer will increment according to predefined intervals.

Next, at step 235, a determination is made as to whether the predefine time assigned to the timer has expired. If, at step 235, it is determined that the time associated with the timer has not expired, then method 200 will advance to step 240 and at which point a determination will be made as to whether an important stream is still being carried over VPN connection 300.

If, at step 240, user-application 308 has been terminated and user-application 304 has been initiated, then it will be determined at step 240 that "no" there is no important stream and method 200 will advance to step 245.

At step 245, a resume renegotiation message is sent. Step 245 is represented in FIG. 6, where laptop 78-1 is shown sending a resume renegotiation message R to VPN concentrator 62. Message R is a single message, and thereafter communications between laptop 78-1 and server 54 will resume to the format represented in FIG. 4.

Returning now to step 240, assuming that user-application 308 has not been terminated, then it will be determined at step 240 that "yes", an important stream is still active and method 200 will return to step 230 and the timer will continue to be incremented as previously described.

Returning now to step 235, assuming that sufficient time has passed it will be determined that the time associated with the timer has expired, at which point method 200 will return to step 215 and at which point a determination will be made as to whether an important stream is still being carried over VPN connection 300. If, at step 215, it is determined that user-application 308 has not been terminated then method 200 will advance to step 220 and method 200 will continue as previously-described.

If, however, at step 215 it is determined that user-application 308 has been terminated then method 200 will continually cycle at step 215, as previously described. In this circumstance, the delay renegotiation message received by VPN concentrator 62 will not be refreshed, and thus VPN concentrator 62 will, after the predefined time period elapses, force laptop 78-1 to renegotiate VPN connection 300.

Figure 8:
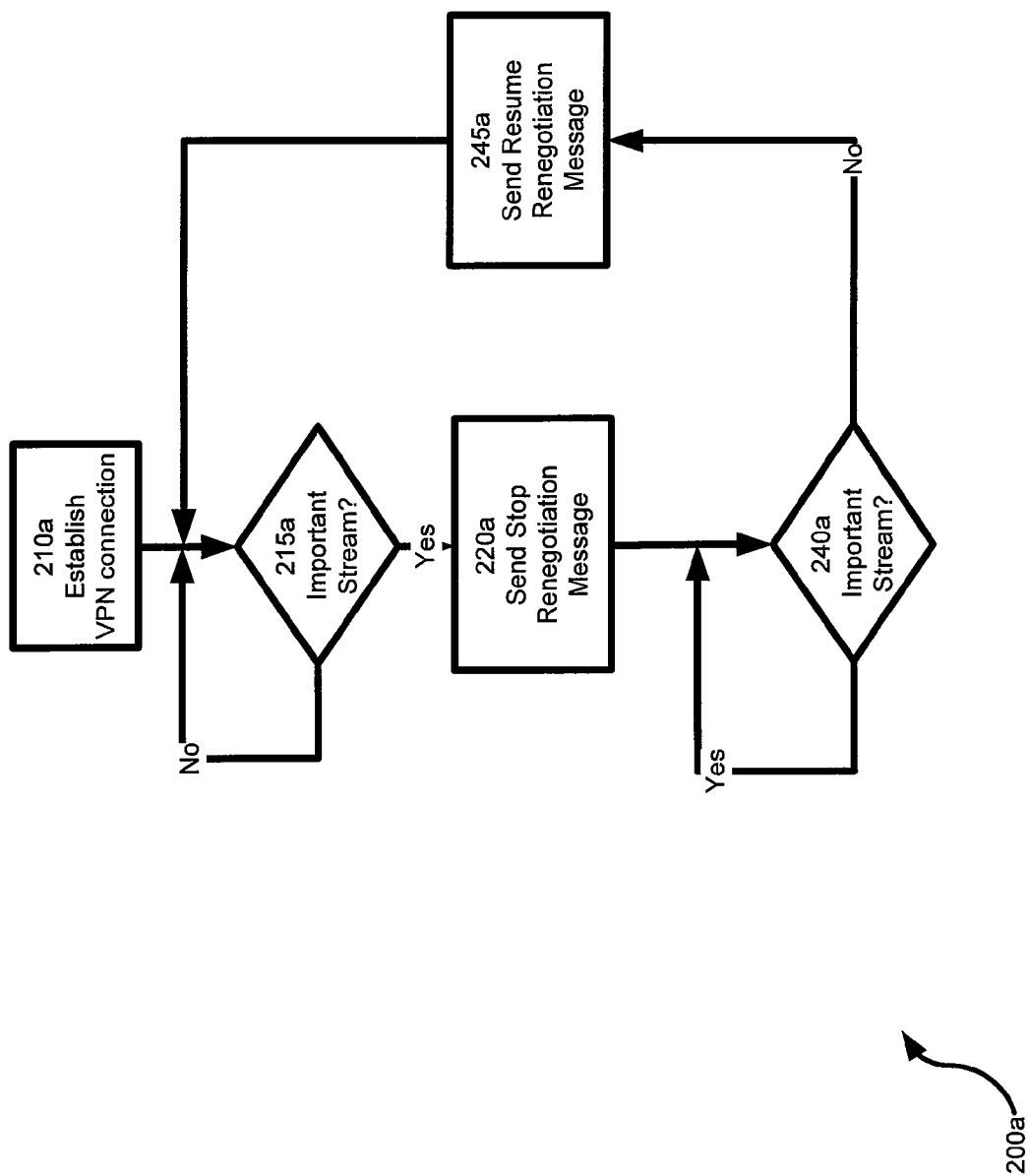
FIG. 8 shows a variation of the method of FIG. 2.

FIG. 8 shows an example of a variant of method 200, which is indicated in FIG. 8 as method 200a. In method 200a, the delay-renegotiation message is replaced with a stop-renegotiation message. The stop-renegotiation message is sent to VPN concentrator 62 at step 220a, so that VPN concentrator 62 ceases to require that VPN connection 300 be invoked until such time as there is no longer an important stream detected at step 240a, at which point at step 245a the resume-renegotiation message is sent to VPN concentrator 62 and thereby cause VPN concentrator 62 to resume demanding renegotiation of VPN connection 300 after a predefined period of time. Method 200a is, however, presently less preferred as it could result in a security lapse for VPN concentrator 62 as a means to completely bypass security benefits achieved from the forced periodic renegotiation of VPN connection 300. Other variants of method 200 will now occur to those of skill in the art.

Figure 9:
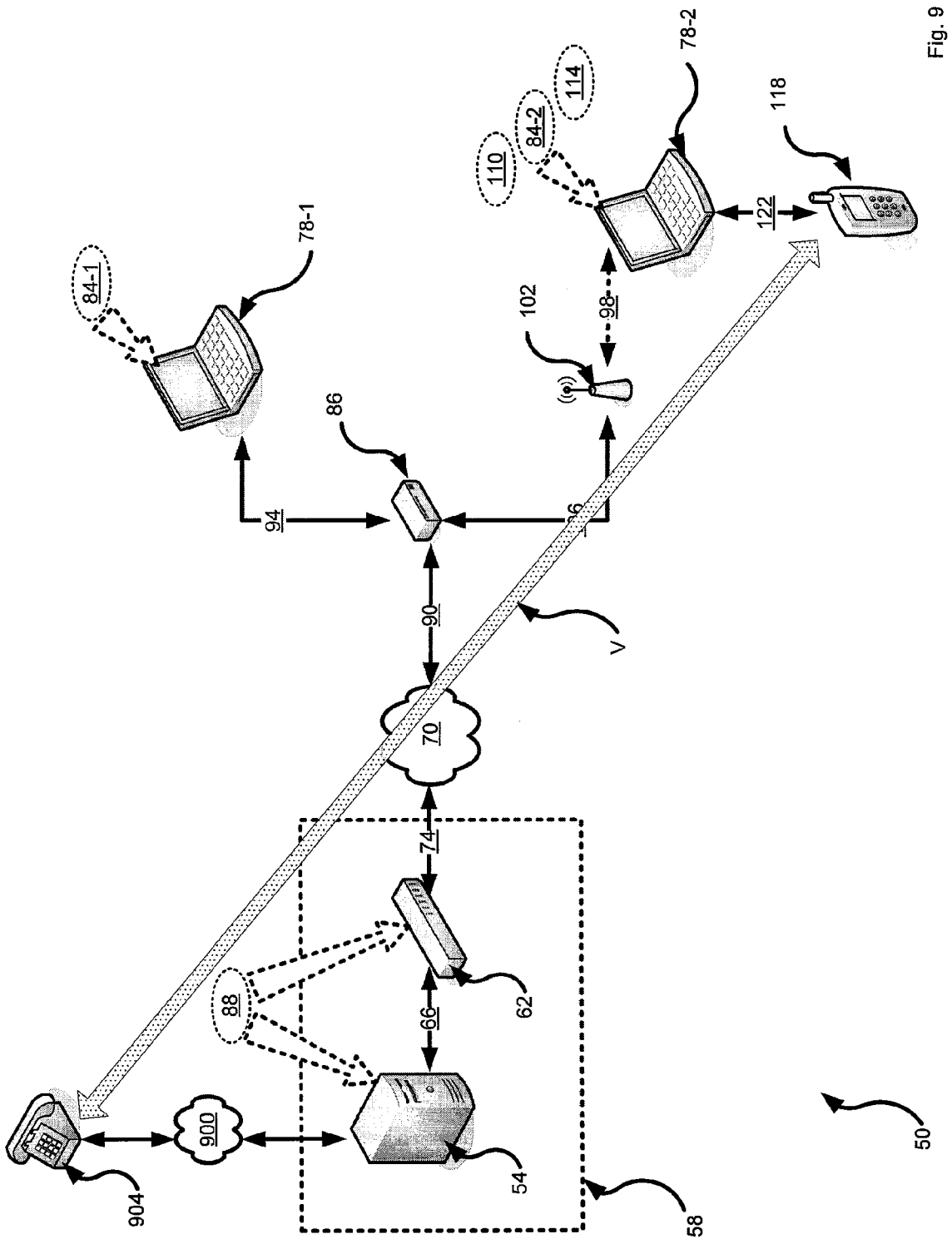
FIG. 9 shows a variation of the system of FIG. 1.

It should now be apparent that method 200 and its variants are also useful for other hardware configurations. For example, FIG. 9 shows a variant of system 50 which includes the PSTN 900 and a traditional telephone handset 904. In FIG. 9, server 54 operates as a PSTN gateway, and thereby can carry telephone communications between handset 904 and handset 118, represented as voice call V in FIG. 9. Voice call V can be carried over a VPN connection (like VPN connection 300) and will therefore be secure from eavesdropping. Of particular advantage, voice call V will be secure from eavesdroppers attempting to listen to packets being carried over WIFI link 98. This can be particularly of value where WIFI access point 102 is a public WIFI hotspot, and thus VOIP voice calls carried thereover are particularly vulnerable to eavesdropping. This can thus permit a user of laptop 78-2 to roam and make WIFI calls in a secure manner. Of even greater advantage, however, when voice call V is carried using method 200, or its variants, such a call can be made with reduced concern that the call will be periodically dropped as VPN concentrator 62 will be instructed to delay (or even stop) demanding that the VPN connection carrying voice call V be renegotiated at least for the duration of voice call V.

Those of skill in the art will now recognize that the VOIP functionality offered by laptop 78-2 and handset 118 can be combined into a single portable handset, such as a WIFI enabled Blackberry™ device from Research In Motion Inc. of Waterloo, Canada. In this manner, secure portable VOIP telephony can be offered using method 200 when such telephony is conducted via a WIFI hotspot.

By the same token, it should be understood that method 200 and its variants can be performed by different devices or components. For example, method 200 could be performed by a suitably modified version of access point 102 or a suitably modified version of router 86, should those components determine that a particular VPN connection being carried thereover is an important stream. Likewise, VPN concentrator 62 itself can be configured to determine if an important stream is being carried and accordingly delay the requirement for renegotiation of the VPN connection accordingly.

While the foregoing describes certain specific embodiments, combinations, variations and subsets of those embodiments are contemplated. They are not intended to unduly restrict the scope of the claims attached hereto.

The invention claimed is:

1. A method for carrying communications over a virtual private network (VPN) connection established between a client machine and a server via a VPN component, the method comprising:
periodically determining whether a stream of data being carried over the VPN connection is important;
instructing the VPN component to delay periodic requesting of renegotiation of the VPN connection when it is determined that the stream of data is important; and,
instructing the VPN component to resume periodic requesting of renegotiation of the VPN connection when it is determined that the stream of data is not important.

2. The method of claim 1 wherein the stream of data is a voice telephone call and the stream is determined to be important.

3. The method of claim 1 wherein the stream of data is carried via the Transport Control Protocol ("TCP") and the stream is determined to be important.

4. The method of claim 1 wherein the periodically determining step is performed by the client machine.

5. The method of claim 1 wherein the periodically determining step is performed by the VPN component.

6. The method of claim 1 wherein the VPN connection has a priority indicator associated therewith; the priority indicator for indicating whether the stream of data is important.

7. The method of claim 1 wherein the client machine is a WIFI-enabled portable handset configured to establish voice over Internet protocol telephone calls via WIFI hotspots.

8. The method of claim 1 further comprising:
after instructing the VPN component to delay periodic requesting of renegotiation of the VPN connection, resetting a timer, and prior to expiry of the timer:
automatically instructing the VPN component to resume periodic requesting of renegotiation of the VPN connection.

9. The method of claim 8 further comprising:
prior to automatically instructing the VPN component to resume periodic requesting of renegotiation of the VPN connection, determining if the stream of data remains important and,
if the data stream remains important, incrementing the timer; and,
if the data stream is determined not to be important, automatically instructing the VPN component to resume periodic requesting of renegotiation.

10. A system for carrying communications comprising:
a client machine for connecting to a network;
a virtual private network (VPN) component;
a server associated with the VPN component and connected to the client machine via the network through the VPN component;
the server and the client machine collectively configured to establish a VPN connection therebetween;
the client machine configured to periodically determine whether a stream of data being carried over the VPN connection is important;
the client machine configured to instruct the VPN component to delay periodic requesting of renegotiation of the VPN connection when it is determined that the stream of data is important; and,
the client machine configured to instruct the VPN component to resume periodic requesting of renegotiation of the VPN connection when it is determined that the stream of data is not important.

11. The system of claim 10 wherein the VPN component is a VPN concentrator.

12. The system of claim 10 wherein the VPN component is incorporated into the server.

13. The system of claim 10 wherein the stream of data is a voice telephone call and the stream is determined to be important.

14. The system of claim 10 wherein the stream of data is carried via the Transport Control Protocol ("TCP") and the stream is determined to be important.

15. The system of claim 10 wherein the VPN connection has a priority indicator associated therewith; the priority indicator for indicating whether the stream of data is important.

16. The system of claim 10 wherein the client machine is a WIFI-enabled portable handset configured to establish voice over Internet protocol telephone calls via WIFI hotspots.

17. The system of claim 10 where the client machine is configured, after instructing the VPN component to delay periodic requesting of renegotiation of the VPN connection, to reset a timer, and prior to expiry of the timer, to automatically instruct the VPN component to resume periodic requesting of renegotiation of the VPN connection.

18. The system of claim 17 where the client machine is configured:
prior to automatically instructing the VPN component to resume periodic requesting of renegotiation of the VPN connection, to determine if the stream of data remains important and,
if the data stream remains important, to increment the timer; and,
if the data stream is determined not to be important, to automatically instruct the VPN component to resume periodic requesting of renegotiation.

19. A device for enabling communications with a server over a network via a virtual private network (VPN) connection, the network including a VPN component associated with the server; the device comprising:
a memory;
an application stored in the memory;
a processor for executing the application; wherein the processor, via execution of the application, is configured to:
periodically determine whether a stream of data being carried over the VPN connection is important;
instruct the VPN component to delay periodic requesting of renegotiation of the VPN connection when it is determined that the stream of data is important; and,
instruct the VPN component to resume periodic requesting of renegotiation of the VPN connection when it is determined that the stream of data is not important.

20. A non-transitory computer-readable medium for storing a plurality of programming instructions; the programming instructions implementing a method for carrying communications over a virtual private network (VPN) connection established between a client machine and a server via a VPN component ; the method comprising:
periodically determining whether a stream of data being carried over the VPN connection is important;
instructing the VPN component to delay periodic requesting of renegotiation of the VPN connection when it is determined that the stream of data is important; and,
instructing the VPN component to resume periodic requesting of renegotiation of the VPN connection when it is determined that the stream of data is not important.

21. A virtual private network (VPN) component associated with a server for carrying communications between a client machine and the server over a network, the server and the client machine collectively configured to establish a VPN connection therebetween; the VPN component comprising:
a memory;
an application stored in the memory;
a processor for executing the application; wherein the processor, via execution of the application, is configured to:
periodically obtain a determination whether a stream of data being carried over the VPN connection is important;
delay periodic requesting of renegotiation of the VPN connection when it is determined that the stream of data is important; and,
resume periodic requesting of renegotiation of the VPN connection when it is determined that the stream of data is not important.

* * * * *